Figure 1:
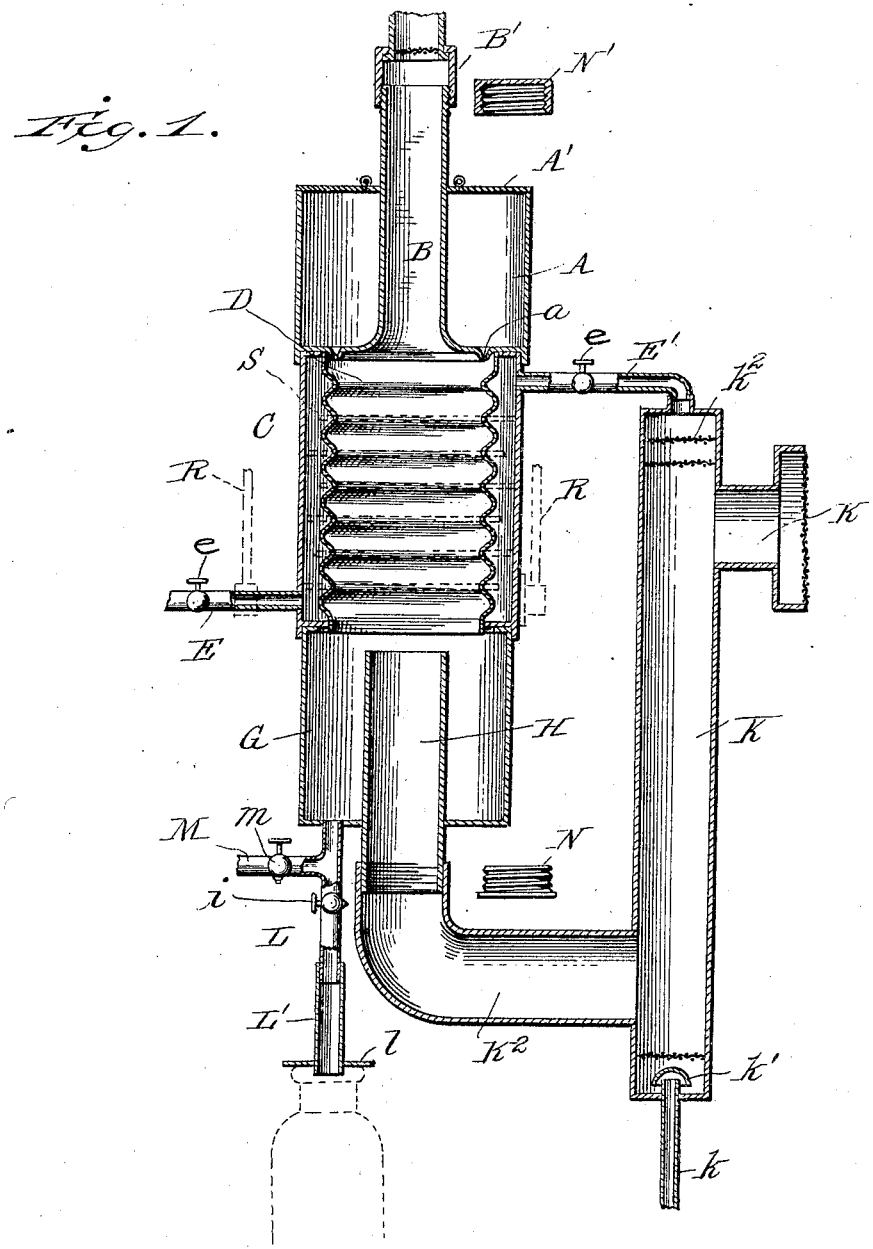

No. 796,407. PATENTED AUG. 8, 1905.
W. E. BAILEY.
AERATOR AND COOLER FOR LIQUIDS.
APPLICATION FILED OCT. 29, 1904.

2 SHEETS—SHEET 1.

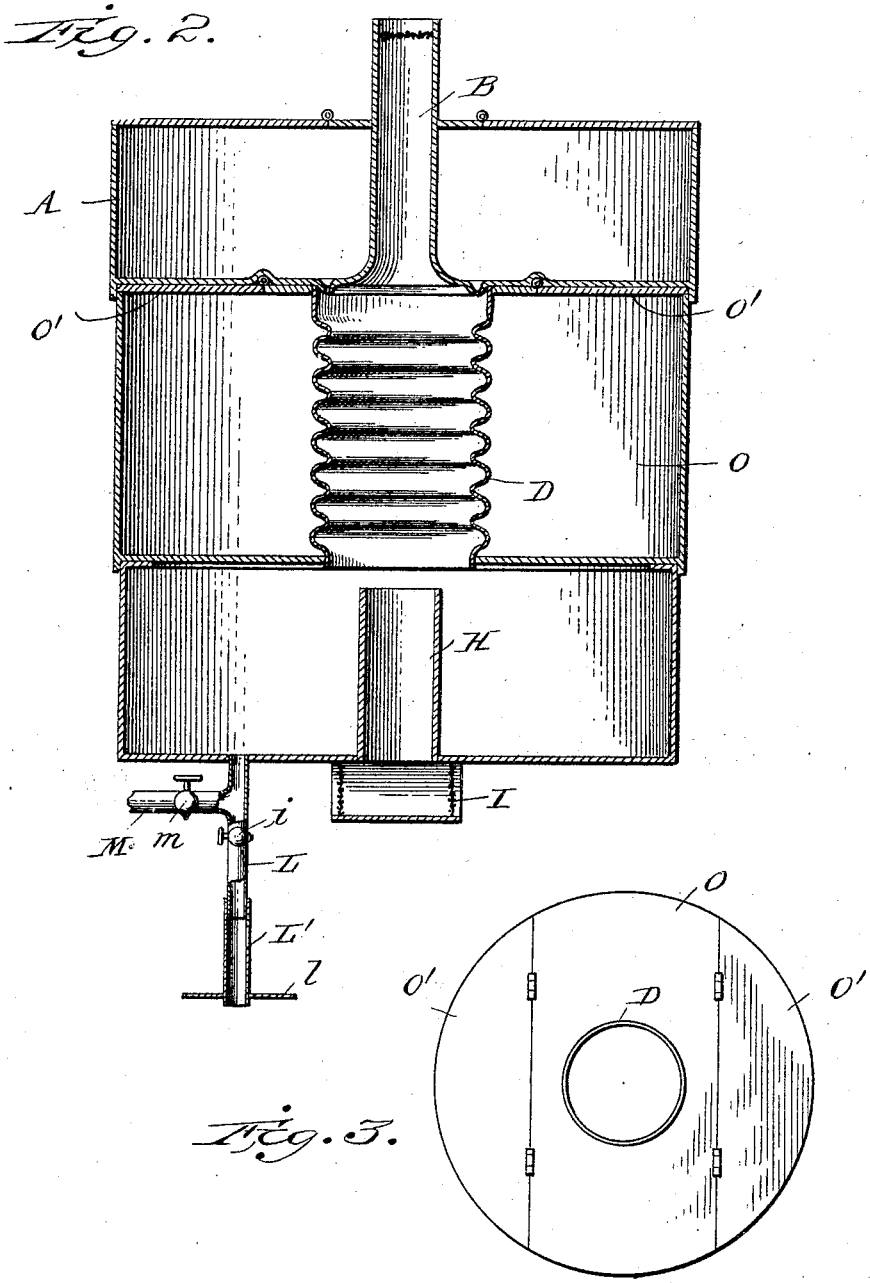

UNITED STATES PATENT OFFICE.

WILLIAM E. BAILEY, OF HARRISBURG, PENNSYLVANIA.

AERATOR AND COOLER FOR LIQUIDS.

No. 796,407.        Specification of Letters Patent.        Patented Aug. 8, 1905.

Application filed October 29, 1904. Serial No. 230,588.

*To all whom it may concern:*

Be it known that I, WILLIAM E. BAILEY, a citizen of the United States, residing at Harrisburg, in the county of Dauphin and State of Pennsylvania, have invented certain new and useful Improvements in Aerators and Coolers for Liquids; and I do hereby declare the following to be a full, clear, and exact description of the same, reference being had to the accompanying drawings, forming a part of this specification, and to the letters of reference marked thereon.

This invention relates to improvements in apparatus for cooling and aerating liquids, the form of the apparatus illustrated in the accompanying drawings and particularly described herein being especially designed for aerating and cooling milk; but it will be understood that the invention is not limited to this particular use, but is capable of a general use wherever it is desired to aerate or cool any liquids while protecting them from contamination or where it is desired to subject the apparatus to a sterilizing process by the use of steam confined in the apparatus itself.

The invention consists in a device for the purpose stated having a liquid supply or distributer, a receiver for the liquid, and an intermediate cooler and aerator having an extended surface over which the liquid flows from the distributer, the said parts being inclosed to form a duct or passage therethrough for the air for aeration or a chamber for the sterilizing-steam.

The invention further consists in a cooler and aerator having an internal cooling and aerating surface closed to the external air, but having means for supplying and passing a current of pure air therethrough.

The invention further consists in a cooler and aerator having an internal cooling and aerating surface, with means for closing said aerator and cooler and supplying steam for sterilizing the cooling and aerating surface.

Finally, the invention consists in certain novel details of construction and combinations and arrangements of parts, all as will be now described, and pointed out particularly in the appended claims.

Referring to the accompanying drawings, Figure 1 is a vertical section through a milk cooler and aerator embodying the present improvements. Fig. 2 is a similar figure through the modified form of milk cooler and aerator designed particularly for use where no supply of cool running water is available. Fig. 3 is a top plan view showing the covers or hinged lids for giving access to the interior.

Like letters of reference in the several figures indicate the same parts.

Referring particularly to Fig. 1, the letter A indicates a distributer which for convenience is shown in the form of a tank having lids A' at the top, through which the tank may be filled with the fresh milk, and distributing-openings *a* at the bottom, through which the milk is allowed to escape and whereby it is distributed evenly over the cooling and aerating surface. The distributer is provided with a central duct or passage B, which may for convenience lead to the outside of the room or apartment in which the apparatus is located, a slip-joint, such as B', being located in the duct for a purpose to be presently described. Immediately below and in line with the distributer is the cooler and aerator, which in the preferred construction consists of a shell or casing C, having a central cooling or aerating surface over which the milk flows, said surface being preferably a corrugated or undulating surface, as indicated at D, the surface thus corresponding in some measure to the surfaces ordinarily employed for this purpose, although it will be understood that other and well-known arrangements for securing an extended surface and insuring the even distribution of the milk may be employed without departing from the invention. The casing C and corrugated inner wall D constitute in the form of apparatus shown a circulating-tank for the cooling medium, which in this instance is supposed to be cold water, and suitable inlet and outlet pipes E and E', with stop-cocks *e* therein, are provided at bottom and top, respectively, for the admission and control of the cooling medium. The tank G for the reception of the cool and aerated milk is located immediately below the cooler and aerator just described, said tank being provided with a central air duct or passage H, preferably alining with the cooling and aerated chamber and duct B of the distributer.

The three sections—namely, the distributer, aerator proper, and receiving-tank—are formed separate from each other to facilitate manufacture and cleaning and are adapted to be assembled in line with relatively close fitting joints, and for convenience one may be seated directly on the other, as illustrated, and suitably connected where so desired, the object being to provide a structure through which an upward current of air may be caused to flow at the same time that the milk is allowed to flow down or in an opposite direction over the cooling and aerating surface and at the same time to protect said milk from liability of contamination from the surrounding air or from insects which might gain access thereto were the cooling and aerating surface exposed in the apartment where the operators perform their duties. Obviously the air inlet and outlet openings may be screened or protected by suitable filters, and the natural difference in temperature, due to the presence of the fresh warm milk, may be utilized as the means for creating the necessary air-current through the apparatus, as shown, for instance, in Fig. 2, where the air-inlet is simply carried through the receiving-tank and provided with screens or filters I; but in the preferred construction means are provided for increasing the flow of air through the apparatus and for freeing said air from dust or contaminating bacteria. In order to carry out this portion of the invention in the simplest possible manner, the water escaping from the cooling-tank is utilized as the means for purifying and creating a current of air through the cooler and aerator, and for this purpose it is showered or allowed to drop freely through a vertically-arranged tower or pipe K, having near its upper end a screened air-inlet K' and near its lower end a duct $K^2$, which is put in communication with the lower end of the duct H, the bottom of said tower being provided with an escape-pipe $k$, having a cap $k'$ adapted to form a water seal. The water passing into the tower K through the exit-pipe E' is distributed in the upper end of the tower by a screen or foraminous plate or plates $k^2$, so as to be showered down through the tower uniformly. In action it will in the well-understood manner carry with it a large volume of air, entering through the opening K', which air will be thoroughly cleansed by the water and can only escape through the opening $K^2$, leading into the cooler and aerator, as before explained.

To still further carry out the objects of the present invention, the discharge for the receiving-tank G is preferably in the form of a pipe L, having a telescoping end L' provided with a flange $l$, which is adapted to be drawn down into intimate contact with the mouth of a can, bottle, or receiver placed beneath the same, as indicated in Fig. 1, thus providing means whereby the milk may be discharged into the can, bottle, or other receptacle without being exposed to the external atmosphere at all.

The discharge-pipe L may be provided with a stop-cock $l'$, and as a convenient means for admission of steam for the purpose of sterilization a branch pipe M, having a stop-cock $m$, may also be provided.

Obviously any ordinary or preferred bottling arrangement may be employed, if desired; but preference should be given to those forms in which the milk is not exposed to the air in its passage to the bottles.

When it is desired to cleanse and sterilize the apparatus, it is preferred that the air-passages should be closed, and to facilitate this the joint between the pipes $K^2$ and H is a simple slip-joint, and a cap N is provided for closing the lower end of the pipe H. If pressure is desired, the upper end of the pipe B is also closed by a cap N', and the sterilization may be proceeded with without the escape of steam into the apartment and without subjecting the operators to the inconvenience which such escape would entail.

Where it is impracticable or undesirable to employ running water as the cooling medium, it is obvious that the tank or chamber for said cooling medium may be enlarged for the reception of ice or a large body of cold water, and in Fig. 2 such an arrangement is illustrated, the letter O in this figure indicating a relatively large tank surrounding the cooling and aerating surface, said tank being provided with hinged lids O', through which a tank may be filled with ice or ice and water.

When it is desired to mechanically clean the apparatus, it is obvious that the three sections may be separated and each cleaned separately in the ordinary manner; but it is preferred to support the whole apparatus from overhead beams, and in Fig. 1 in dotted lines hangers R are shown; but it will be understood that this is simply an illustration of a well-known means for supporting apparatus of this character now in common use, and I do not wish to be limited to this particular means or to any other particular means, inasmuch as the particular installation of each apparatus and the conditions under which it is used will to a large extent control the way of mounting or supporting the several sections; but in every instance the sections should be made separate and so assembled that they may be readily separated for cleaning purposes.

To secure a uniform circulation of the cooling medium, the control-section may be divided to form a duct for the passage of the cooling medium, and in illustration of this idea baffle-plates are shown in dotted lines at S in Fig. 1.

While I have described specifically herein a cooler and aerator, it will be readily seen that the apparatus is equally applicable to a heater and aerator, in which instance a heating instead of a cooling medium is employed for controlling the temperature of the aerating-surface, and hence it will be understood that I do not wish to be limited in this respect by the use of the word "cooling" or "cooler."

Having thus described my invention, what I claim as new, and desire to secure by Letters Patent, is—

1. A liquid cooler and aerator embodying three separable sections assembled in vertical alinement to prevent access of atmospheric contaminations, the central section comprising an external casing and an extended internal cooling and aerating surface, the top section comprising a distributer for distributing the liquid to the cooling and aerating surface and the bottom section comprising a receiver for the cooled and aerated liquid; substantially as described.

2. A liquid cooler and aerator embodying three separable sections assembled in vertical alinement to prevent access of atmospheric contaminations, the central section comprising an external casing and an extended internal cooling and aerating surface forming a passage through the section, the top section comprising a distributer for distributing the liquid to the internal surface of the central section and having an air-passage therethrough, and the bottom section comprising a receiver for the cooled and aerated liquid and having an air-passage therethrough, whereby air may be caused to flow through all said sections; substantially as described.

3. In a cooler and aerator such as described, the combination with the liquid-distributer, cooling and aerating surface and receiver having an air-passage therethrough, of an air-purifier comprising a vertically-arranged tower having an air-entrance near the top, an air-discharge near the bottom communicating with the passage through the aerator and cooler, a water-supply opening into the top of the tower and a water-discharge at the bottom of said tower; substantially as described.

4. In a cooler and aerator for milk the combination with the liquid-handling devices embodying an extended cooling and aerating surface closed against atmospheric contaminations, of an air purifier and forcer embodying a vertically-arranged tower having a liquid supply and distributer at the top and a liquid-discharge at the bottom closed to the escape of air, and also having an air-entrance near the top and an air-discharge near the bottom leading to a point in proximity to the aerating and cooling surface; substantially as described.

5. A cooler and aerator for milk embodying three sections in vertical alinement, the central section comprising an external casing and an extended internal cooling and aerating surface, and top and bottom sections communicating with the interior of said central section, and means for forcing steam through said sections.

WILLIAM E. BAILEY.

Witnesses:
THOMAS DURANT,
ALEXANDER S. STEWART.